United States Patent [19]

Foster

[11] 4,260,044
[45] Apr. 7, 1981

[54] PEDAL ACTUATED BRAKE CONTROL SYSTEM

[76] Inventor: Edwin E. Foster, 1801 Camp Croft Rd., Austin, Tex. 78746

[21] Appl. No.: 29,712

[22] Filed: Apr. 11, 1979

Related U.S. Application Data

[63] Continuation-in-part of Ser. No. 937,465, Apr. 28, 1978.

[51] Int. Cl.³ ............................................. B60L 5/06
[52] U.S. Cl. ........................................ 192/5; 188/24; 280/259
[58] Field of Search .................... 192/5, 6 R, 6 B; 188/24; 280/259, 260, 261

[56] References Cited

U.S. PATENT DOCUMENTS

| | | | |
|---|---|---|---|
| 658,269 | 9/1900 | Lloyd | 192/5 |
| 765,945 | 7/1904 | Weiler | 192/5 |
| 3,888,334 | 6/1975 | Mack | 188/24 |
| 4,030,774 | 6/1977 | Foster | 280/261 |

FOREIGN PATENT DOCUMENTS

231853 7/1944 Switzerland ............................. 192/5

Primary Examiner—George H. Krizmanich
Attorney, Agent, or Firm—Kalish & Gilster

[57] ABSTRACT

A bicycle having front and rear wheel caliper brakes, a pedal crank assembly having a shaft extending through a hub and projecting at its ends therebeyond for connection to pedal cranks. The shaft may be integral with the pedal cranks or may be discretely formed and threadedly secured at its ends to the pedal cranks. The bicycle also contains a brake control assembly having a cam mounted on the shaft outwardly of the hub for rotation with the shaft, the cam having at least one working edge surface, a plate carried on the shaft in substantially planar parallel relationship to the cam. The plate pivotally mounts a cam follower, in the nature of a pawl, for engaging said cam working edge upon back pedalling operation. A substantially vertically extending rod is loosely engaged at its lower end to the plate and fixedly engaged in its upper end portion to brake control cables leading from the caliper brakes. The rod is journalled for axial rotation and resilient means urges the same into spaced relationship with respect to the cam follower with which the rod is engageable upon rotation for releasing the cam follower from engagement with the cam.

9 Claims, 15 Drawing Figures

FIG. 13

PEDAL ACTUATED BRAKE CONTROL SYSTEM

BACKGROUND AND SUMMARY OF THE INVENTION

This application is a continuation-in-part of application Ser. No. 937,465 filed Apr. 28, 1978 upon an invention entitled "Bicycle Pedal Actuated Brake Control and Release System."

The present invention relates in general to bicycles and, more particularly, to pedal actuated braking systems therefor.

With the advent of caliper brakes on bicycles, there have been numerous efforts to develop brake controls which may be actuated by the pedals, as opposed to the utilization of hand controls, for the purpose of enhancing the safety of the rider. Among such prior efforts are the systems shown in U.S. Pat. Nos.: 3,858,689; 3,966,299 and 4,030,774; as well as the inventor's co-pending application Ser. No. 799,566 filed May 23, 1977 upon an invention entitled "Bicycle" now U.S. Pat. No. 4,171,824, as well as the aforesaid parent application. Although the aforesaid prior art does disclose efficient means for releasing such brakes from braking condition, there is the continual desire to effect further developments which may be fundamentally of suitable applicability to both American and foreign made bicycles. When one recognizes that, for the most part, American made bicycles incorporate a unitary pedal crank assembly wherein the main shaft and the pedal cranks are integrally constructed and wherein foreign made bicycles the pedal cranks are constructed independently of the main shaft and are designed for suitable mechanical interengagement therewith.

Therefore, it is an object of the present invention to provide a pedal actuated braking system for bicycles which is fundamentally adapted for use with both the American one piece crank assembly and the foreign three piece crank assembly, and which may be installed upon the related bicycle in a most facile manner and without requiring any costly modification of such bicycle.

It is another object of the present invention to provide a pedal actuated brake of the type stated which consists of a singular paucity of parts, all of which are of durable, sturdy, yet simple construction and which are interrelated for reliable, effective coaction.

It is another object of the present invention to provide a pedal actuated brake for bicycles which is peculiarly adapted for utilization with bicycles equipped with foot actuated brake releasing means as of the character shown in the aforesaid parent application Ser. No. 937,465.

It is a still further object of the present invention to provide a bicycle adapted for pedal actuated braking, but which is provided with a conveniently located manually operated device for releasing the brakes or for preventing braking action during backing movement of the bicycle, such as into suitable parking position.

It is yet another object of the present invention to provide a pedal actuated bicycle braking system of the type stated wherein a manually operated control rod is provided, the vertical movement of which is simply effected, without necessitating the rider's dismounting, so as to inhibit braking action for a preselected interval.

It is a further object of the present invention to provide a pedal actuated braking system for bicycles which is designed for mounting upon a bicycle incorporating an adjustable seat assembly as set forth in co-pending application Ser. No. 799,566.

In essence, the present invention resides in providing a cam and pawl arrangement on one of the pedal cranks for engaging upon back pedalling so as to bring about a braking condition with each of the wheels upon which there is mounted a caliper brake. A control rod adapted for vertical movement by upward pulling by the rider, without dismounting, is designed to engage the pawl so as to remove same from either engagement or potential engagement with the cam so as to inhibit braking action for such preselected period as the user may desire, as for instance during backing up movement.

DESCRIPTION OF THE PRACTICAL EMBODIMENTS

Referring now by reference numerals to the drawings which illustrate the practical embodiments of the present invention, A generally designates a bicycle including a frame F having a front fork 1 mounting a front wheel 2, a rear fork 3 mounting a rear wheel 4, with there being a cross bar 5 connecting said forks 1, 3. Frame F also incorporates front and rear diagonal bars 6, 7, respectively, which at their lower ends merge into the usual hub 8. Said bar 7 constitutes a seat post being of tubular character and opened at its upper end for projection therethrough of the upper end portion of a seat adjustment member 9 surmounted by seat 10; the same constituting a seat adjustment assembly as set forth and described in co-pending patent application Ser. No. 799,566 filed May 23, 1977 and entitled "Bicycle". At its forward upper end front diagonal bar 6 is integral with the upper portion of post 11 of front fork 1, while the upper end of rear diagonal bar 7 is unitary with the upper end of fork 3 and the rearward end of cross bar 5. Mounted upon post 11 are handle bars 12. Diverging rearwardly from hub 8 are the usual support bars 13, 14 for the rear axle a. Each wheel 2, 4 is of the spoke-type, embodying the customary rim 15 for receiving a tire 16.

Figure 1:
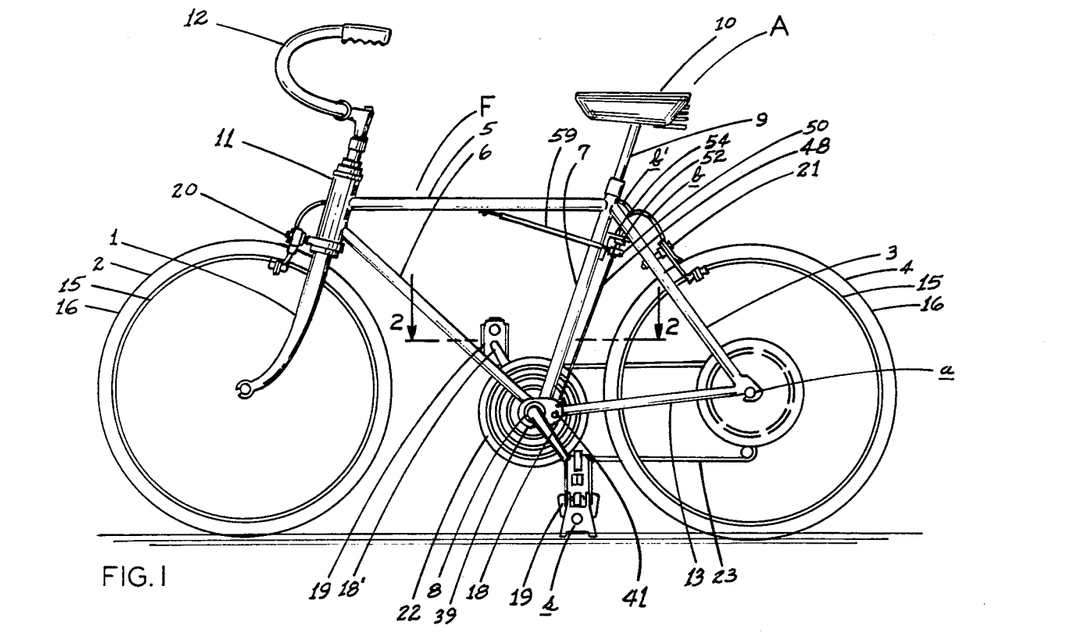
FIG. 1 is a side view of a bicycle having mounted thereon a pedal actuated brake control and release system constructed in accordance with and embodying the present invention as of the type adapted for American made bicycles.

Hub 8 supports a shaft 17 of a pedal crank assembly p, which in most American made bicycles is of one piece construction, with the shaft 17 carrying at each end thereof the usual pedal crank 18, 18' which, at their respective ends, each carry a foot pedal 19. As shown in FIG. 1, foot pedals 19 have engaged thereon bicycle support stands s which may be of the type shown in U.S. Pat. Nos. 3,857,585; 3,877,726; 4,030,774, and pending patent application Ser. No. 799,566 filed May 23, 1977 upon "Bicycle," the operation of which coordinates with the braking action, as more fully developed in the aforesaid patents.

Bicycle A is provided with caliper brakes 20, 21 upon front and rear wheels 2, 4, respectively.

Although the braking system of the present invention is useful upon bicycles of various types, such as single speed, three-speed, and ten-speed; Bicycle A, for purposes of simplicity of exposition, is shown herein as embodying a single front chain wheel or drive sprocket 22 mounted upon hub 8 having engaged thereabout the forward end portion of the usual endless transmission or drive chain 23 which, in its rearward end portion, extends about a driven sprocket (not shown) or a predetermined driven sprocket of a cluster, customarily five, of driven sprockets, or so-called derailleur gears, mounted upon rear axle a in side-by-side relationship on ten-speed bicycles.

Figure 4:
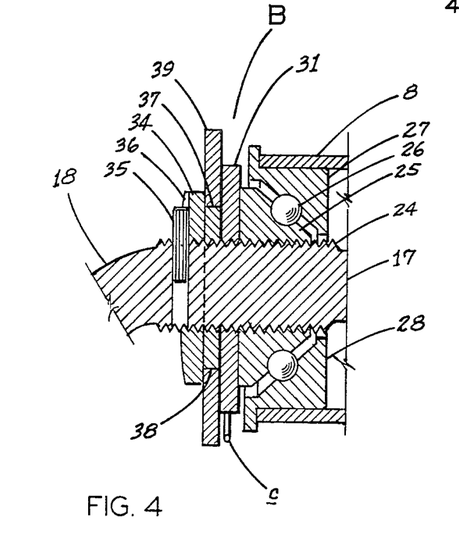
FIG. 4 is a vertical transverse sectional view taken on the line 4—4 of FIG. 2.

Referring now particularly to FIG. 4, it will be seen that shaft 17 immediately proximate crank 18 is externally threaded, as at 24, for threadedly engaging the inner race 25, which is of general conical form, of a ball bearing assembly 26 incorporating as an outer race 27 the inner cooperating portion of a cup 28 of a braking assembly, indicated generally B; ball bearing assembly 26 being thus of well-known construction does not form a part of the present invention. Cup 28 is pressed, as in the usual fashion, within the adjacent end of hub 8 which constitutes a crank housing.

Keyed, as at 30, upon shaft 17 immediately outwardly of inner race 25, is a disc or ratchet cam 31 incorporating a pair of working edge portions 32, 33 which are 180° apart. Threadedly secured upon shaft 17 immediately outwardly of cam 31 is a lock nut 34 for clamping said cam 31 tightly against said inner race 25. To enhance the securement of cam 31 in appropriate disposition is a pin 35 wedgingly engaged within an opening 36 formed in shaft 17 to thereby inhibit any untoward loosening of lock nut 34. Said lock nut 34 is diametrally reduced in its inner portion to provide a peripheral shoulder 37 for extension through an opening 38 formed in an enlarged plate 39 which thereby rides upon said shoulder 37. As may best be seen in FIG. 3, plate 39 is provided with a relatively extensive rear portion, as at 40, and therein, spacedly rearwardly of shaft 17 fixedly mounts a pin 41, which projects inwardly from said plate 39, and upon which is pivotally engaged the rearward end portion of a cam follower or pawl 42 which is adapted to project forwardly within the path of movement of cam 31 upon rotation of shaft 17 during bicycle operation. During forward travel of bicycle A, as indicated by the arrow in FIG. 3, said pawl 42 will ride along the periphery of cam 31, being free to rock about the axis of pin 41, which projects laterally inwardly beyond the inner face of plate 39. However, upon application of a rearward force upon pedal cranks 18, 18' as by back pedalling, the more immediate working edge portion 32, 33, as the case may be, will engage the forward end surface of said pawl 42 and cause a rearwardly directed pressure to be imposed thereagainst consonant with the force applied in the back pedalling action, all of which will be more clearly discussed hereinbelow. To assure maintenance of contact between pawl 42 and cam 31 is a compression spring c, on end of which is engaged to pawl 42 proximate its mounting upon pin 41, as at c', and with the opposite end thereof hookingly received within an opening at the forward end of plate 39, as at c''.

Figure 2:
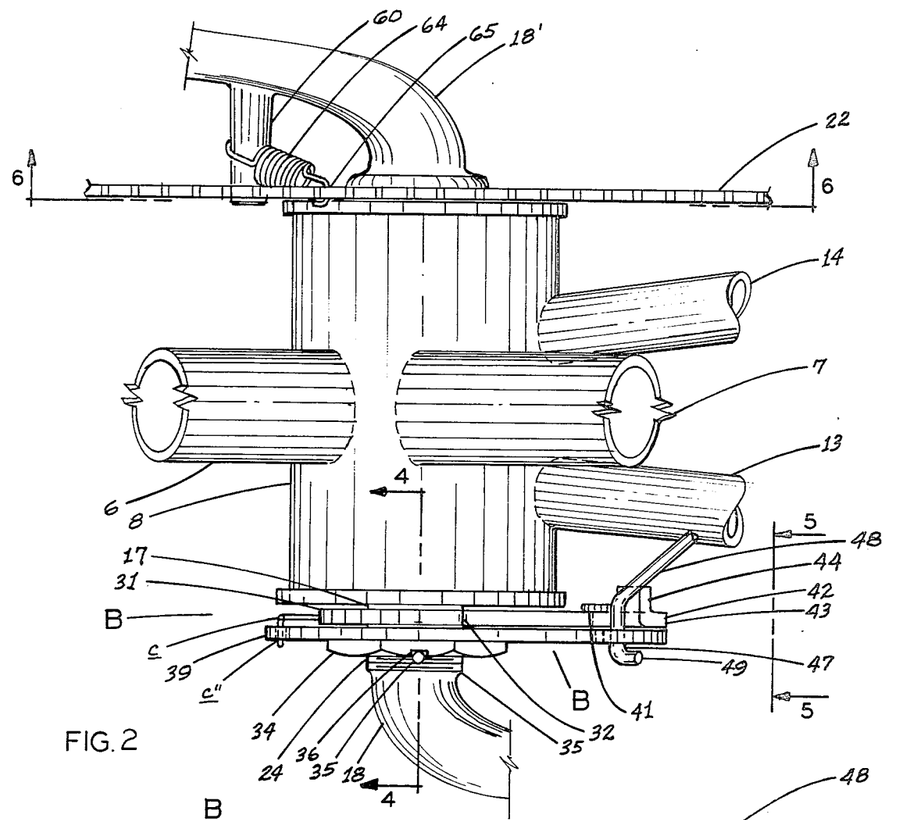
FIG. 2 is a fragmentary top plan view taken on the line 2—2 of FIG. 1.
Figure 5:
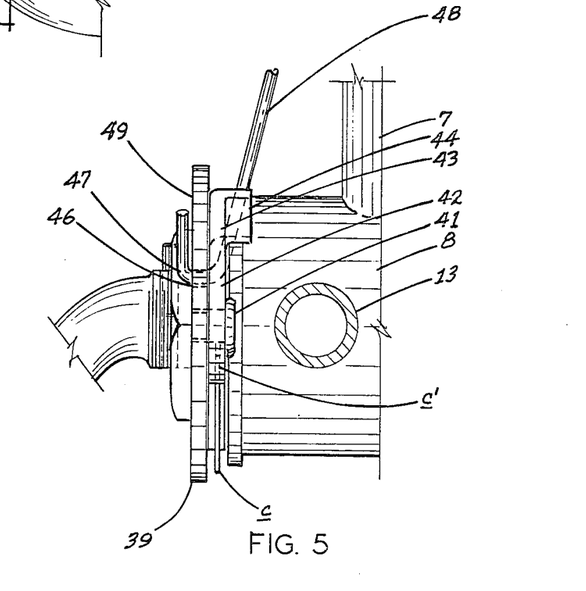
FIG. 5 is a fragmentary rear elevational view, in partial section, taken on the line 5—5 of FIG. 2.

Pawl 42 in its upper rearward portion, is provided with an upwardly projecting boss 43, which latter in its end portion is integral with a laterally in-turned abutment-forming flange 44; said boss downwardly of said flange 44 being rearwardly arcuated to provide a forwardly opening recess 45 which registers with an aperture 46 formed in said plate 39 for extension therethrough of the bight-forming portion 47 of the lower end portion of a control rod 48. It will be seen that the curved nature of the lower end of said rod 48 wherein the normally lower end extremity 49 projects upwardly militates against inadvertent disengagement of rod 48 from plate 39 and with the portion of said rod immediately inwardly of plate 39 being presented to abut against flange 44 (see FIGS. 2 and 5). Aperture 46 is of greater diameter than the cross-section of control rod 48 so that the latter freely and normally relatively loosely extends therethrough. With bicycle A in its normal travel condition, control rod 48 will be spaced from flange 44 so that there is no restrictive contact therebetween; but with the extent of such spacing being such that upon axial twisting or rotating of control rod 48, as for example through an angle of approximately 45°, the same will be brought into abutment with flange 44 for purposes to be described hereinbelow.

Figure 7:
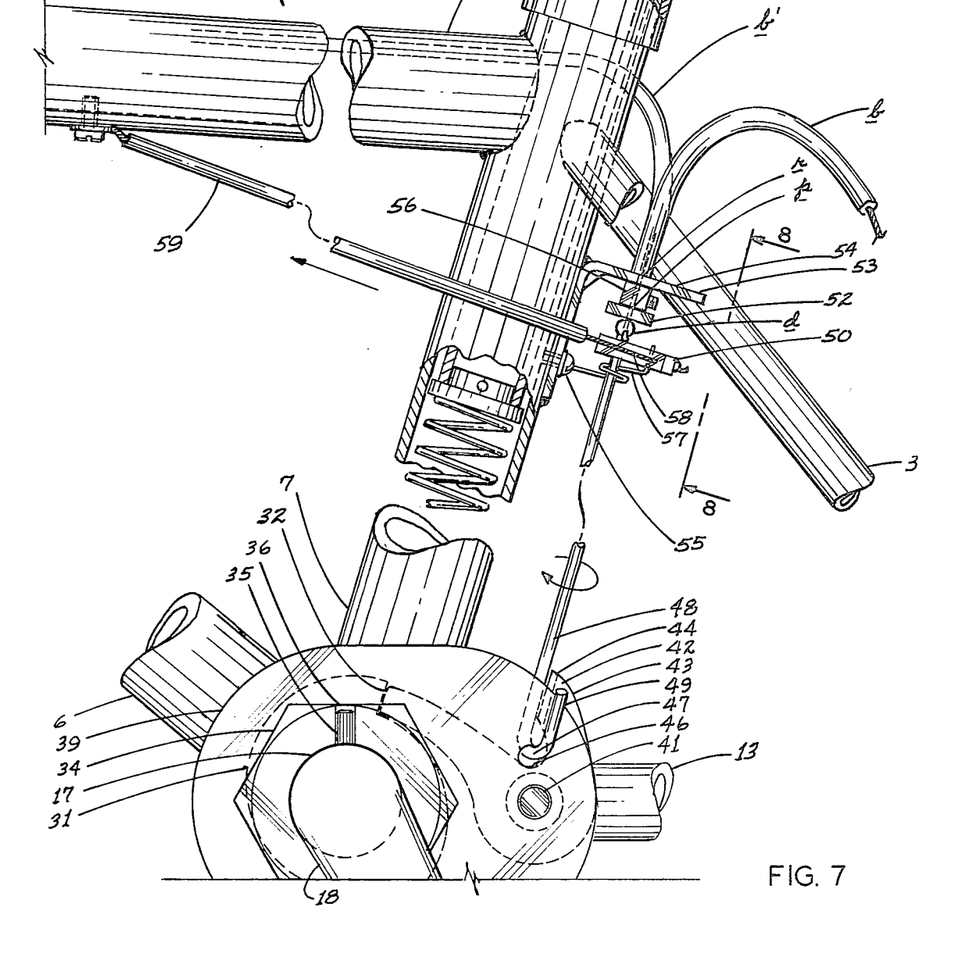
FIG. 7 is an enlarged fragmentary view, in partial section, of the bicycle illustrating the brake and release system therefor.
Figure 8:
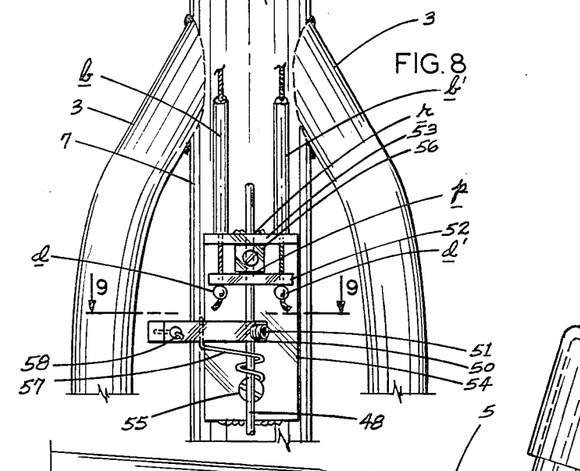
FIG. 8 is a vertical view taken on the line 8—8 of FIG. 7.

As may best be seen in FIGS. 1 and 7, rod 48 progresses upwardly substantially axially parallel with, and rearwardly spaced from, seat post 7 and in the upper end portion thereof, slightly downwardly of a rearward projection of cross bar 5, mounts a lever arm 50, axially normal thereto and being fixedly engaged upon said rod 48 as by a set screw 51. Control rod 48 extends upwardly beyond lever arm 50 through an opening, as at p, of relatively increased diameter, in an equalizer bar 52 and progresses upwardly therebeyond through a relatively enlarged aperture r provided in a horizontal, rearwardly extending, flange 53 of a stamped, angle-shaped bracket 54; said bracket being secured upon seat post 7 as by a bolt 55 or other like fastener means. A locking lug 56 is engaged upon control rod 48 between equalizer bar 52 and flange 53 and being of relatively increased diameter with respect to opening p and aperture r to prevent displacement of control rod 48 relative to plate 52 and flange 53 while permitting twisting or rotating thereof about its axis, for purposes presently appearing.

Lever arm 50 is engaged to one end of a torsion spring 57 which extends about control rod 48. The forward end of torsion spring 57 is suitably secured upon bicycle frame F. The connection between control rod 48 and lever arm 50 is eccentric, being adjacent the normally forward end thereof, so that said lever arm 50 is swingable through an arc having a radius constituted of the major extent of said lever arm 50. Secured proximate the rearward or free end portion of lever arm 50 is one end of a cable 58 which progresses forwardly laterally of seat post 7 on the left hand side thereof as viewed toward the forward end of bicycle A, for connection at the forward end thereof to cross bar 5 which is urged into a taut condition by reason of torsion spring 57 urging lever arm 50 into rearwardly swung position. Provided upon cable 58 may be the usual sheath 59.

Extending through registering openings in flange 53 and equalizer bar 52, on opposite sides of control rod 48, are brake cables b, b' which are sheathed in the usual fashion and engaged at their remote ends to front and rear caliper brakes 20, 21 respectively; the said cables b, b' carrying the usual terminal detents d, d' respectively, beneath and in contact with equalizer bar 52.

Seat post 7 and cooperating seat adjustment member 9 are of like construction and function as disclosed more fully in U.S. Pat. No. 4,171,824, to permit facile height adjustment of the supported seat 10 for both comfort and safety purposes.

Figures 6, 9:
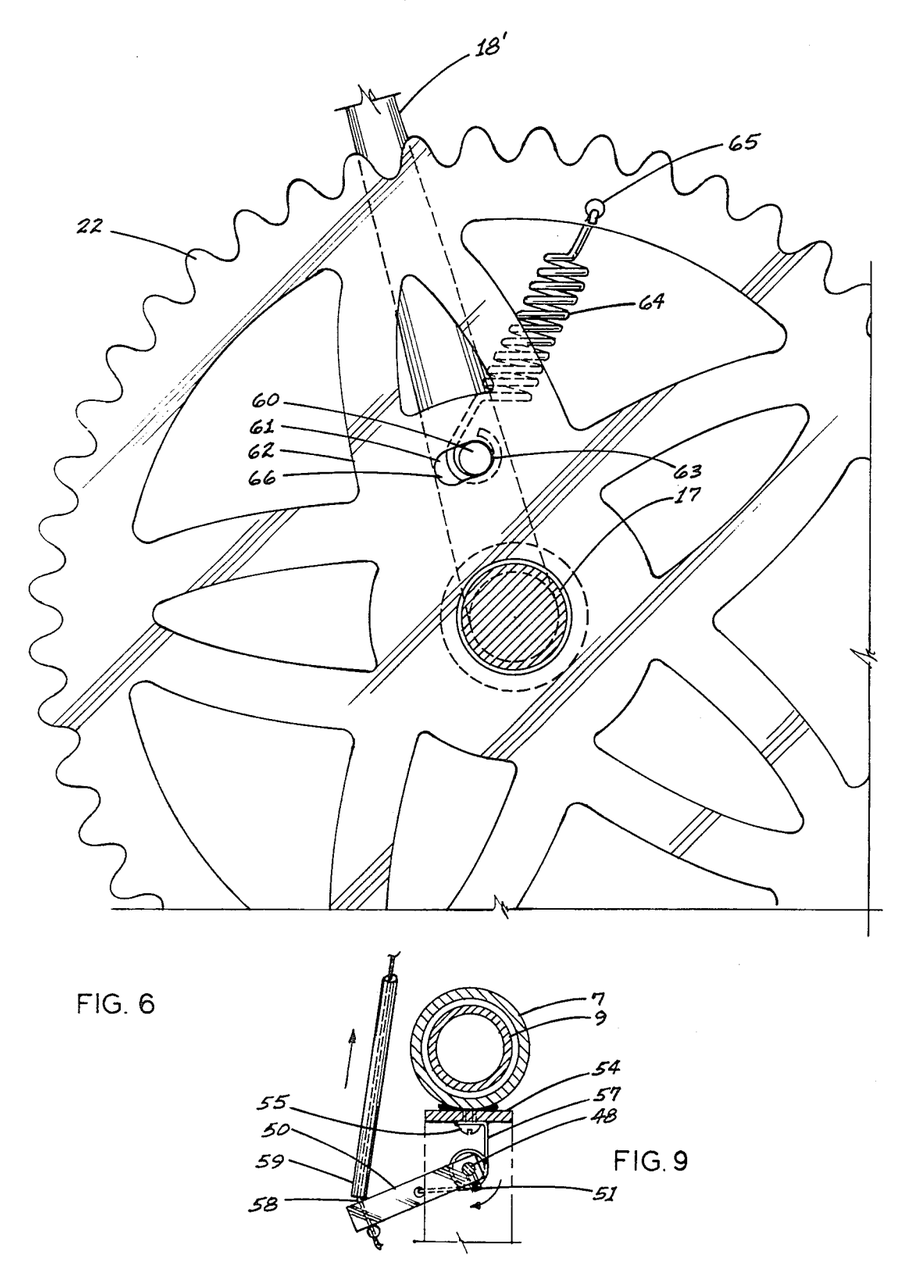
FIG. 6 is a side view taken on the line 6—6 of FIG. 2.
FIG. 9 is a horizontal transverse sectional view taken on the line 9—9 of FIG. 8.

As may best be seen in FIG. 6, bicycle A is provided with a unique structure set forth and described in co-pending application Ser. No. 937,465 for permitting rotation of crank shaft 17 after braking action so that the rider may resume travel without the necessity of undertaking positive action to disengage pawl 42 from cam 31 which, in essence, comprehends the provision of a finger 60 formed integrally with pedal crank 18' for projection into a slot-like aperture 61 formed in the internal support structure 62 of drive sprocket, often times referred to as a front chain wheel, 22. Aperture 61 is radially inwardly from the operating teeth-forming edge of drive sprocket 22. Aperture 61 is of greater length than the cross-section of finger 60 so as to permit relative movement therebetween. Finger 60 is normally urged toward the rearward or trailing end 63 of aperture 61 by a tension spring 64, the rearward end of which latter is engaged as at 65, to the support structure of sprocket 22 and with the forward end of said spring being disposed about finger 60 (FIG. 6). During forward travel of bicycle A, finger 60, through action of crank 17, will be pulled forwardly into abutment against the forward or leading end 66 of aperture 61 with stress being developed in spring 64. However, when back pedalling is effected for braking action, finger 60 will be moved relatively toward the rearward or trailing end of aperture 61 with unstressing of said spring 64. As developed more fully in the aforesaid parent application, such means will permit the brake to be released after braking action by crank 17 being moved forwardly against the bias of spring 64 prior to movement of sprocket 22 for the purpose of driving the rear wheel 4. The crank shaft 17 is permitted to move despite the fact that the upper course of drive chain 23 will be in a taut condition because of braking.

Figure 3:
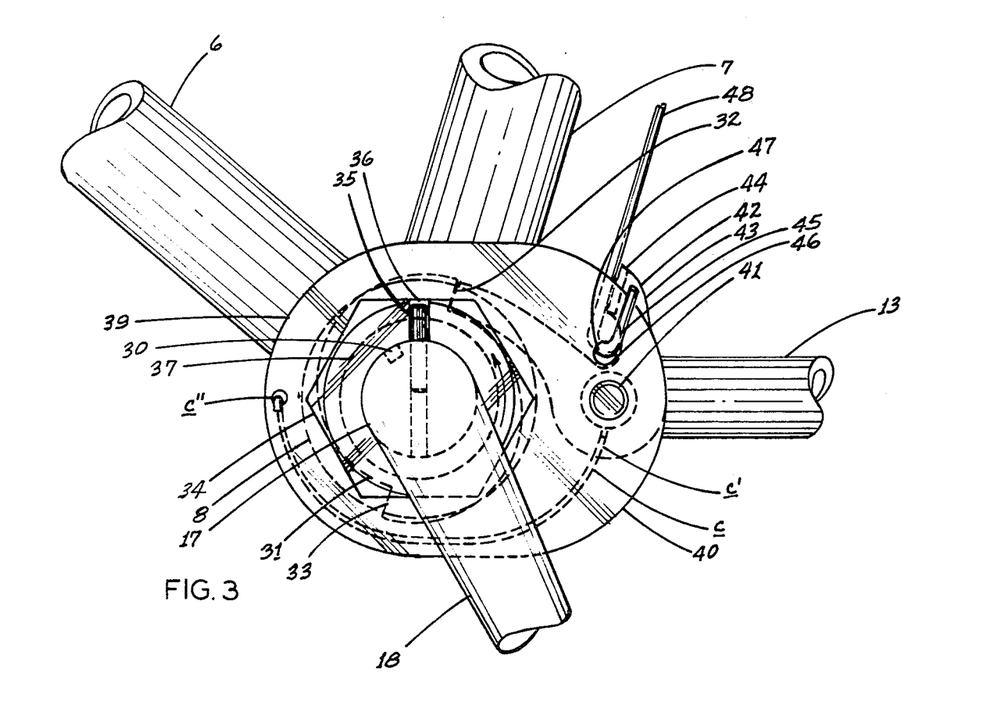
FIG. 3 is an enlarged side view taken on the line 3—3 of FIG. 2.

From the foregoing description, it is believed that the operation of the present invention will be readily comprehensible. As pointed out, during forward travel of bicycle A, pawl 42 will freely ride over the edge of cam 31 so that there is no inhibition to movement. When it is desired to effect braking action, the user will back pedal and thereby cause the more proximate of said cam working edges or lobes 32, 33 to engage the forward end of pawl 42, as shown in FIG. 3. The pressure of such abutment will effect a downward and rearward rocking of plate 39 and thereby cause a downward pull upon control rod 48. Said rod 48 will move relatively downwardly of equalizer bar 52 and flange 53 with locking lug 56 engaging said equalizer bar and forcing same commensurately downwardly, bringing about a downward pull upon front and rear brake cables b b' and cause operation of the associated caliper brakes 21, 20 respectively. By such back pedalling action said brakes may be reliably locked for assuring of full braking action. It will be appreciated that the measurable extent of axial movement of control rod 48 for such purpose is relatively small but with such being adequate to assure of proper braking action.

In order to resume forward travel, the operator need merely initiate forward rotation of pedal crank 18', which will pull finger 60 toward the forward end 66 of aperture 61 with concurrent stressing of spring 64, but with such action having permitted crank 17 to have been moved the distance through aperture 61, which is of sufficient extent to remove the engaged cam lobe 32, 33, as the case may be, from engagement with pawl 42 so that the bicycle is then in condition for continued forward travel. Such disengagement between cam 31 and pawl 42 will allow plate 39 to be restored to normal condition with consequent raising of control rod 48 so as to remove the pressure upon equalizer bar 52 theretofore exercised by locking lug 56 so that the braking pull cables b, b' will be removed.

If it is desired to roll bicycle A backwardly as for the purpose of parking or the like, and in order to prevent braking action which at such juncture would be undesired, the user simply pulls forwardly on sheathed cable 58, which will cause a forward pull upon lever arm 50 and thence an axial, clockwise rotation of control rod 48 causing same to abut against flange 44 and thereby maintain the forward end of pawl 42 in upwardly rocked condition so as to inhibit engagement of the same with cam 31. After the bicycle has been backed up the preferred distance, the user merely releases said cable 58 and by reason of torsion spring 57 acting upon lever arm 50, control rod 48 is rotated in the reverse or counter-clockwise direction as viewed in FIG. 7 so as to be returned to normal condition and be removed from engagement with flange 44, thereby allowing pawl 42 to drop downwardly into operative disposition.

Accordingly, it will be seen that control rod 48 together with the associated structure provides a most unique and highly efficient, simply operated means for releasing bicycle A from braked condition, as well as to prevent premature or undesired braking action; while concurrently providing transmission of braking action from the associated pedal actuated device and the brake cables.

Referring now to FIGS. 10 to 15 inclusive, the present invention is illustrated, and will be described hereinbelow, as adapted for use with foreign made bicycles wherein the main shaft and pedal cranks are independently constructed and suitably interengaged as distinguished from the American made bicycles as described hereinabove wherein the main shaft and pedal cranks are integrated into a single unitary structure. To facilitate the description, elements common to both structures will bear like reference numerals. Accordingly, the main shaft indicated generally at 17' will be of rounded cross-section as journalled within hub 8 and being of quadrilateral or square cross-section in its end portions as at 70, 70' which project beyond hub 8 for engagement thereon of crank arms 71, 71', respectively. It will be observed that main shaft 17' at its end extremities is provided with a diametrally reduced externally threaded terminal as at 72 for engaging a retaining nut 73, which upon tightening, bears against the end of the adjacent square section 70, 70', as the case may be. A threaded cap 74 received within a complementary threaded recess 75 within each crank arm 71, 71' obscures the adjacent nut 73 for both appearance-finishing, as well as safety purposes. Mounted upon shaft end section 70 is a disc or ratchet cam 76 having working edge portions or lobes 77, 77' spaced apart through an angle of 180°. It will be seen that said cam 76 is provided with a complementary opening so as to be received upon the four-sided shaft section 70 and thereby rotatable therewith. Disposed inwardly of cam 76 and engaged upon the adjacent rounded portion of main shaft 17' is a plate 78; being eccentric with respect to shaft 17' so as to have its major portion projecting rearwardly thereof; plate 78 and cam 76 are planarwise parallel. Fixed in the rearward central portion of plate 78 for projection laterally outwardly thereof is a pin 79. Said pin 79 in its outer portion rockably mounts the rearward end of a pawl 80 which extends forwardly, into a hook portion 81 serving as a cam follower for freely riding on the periphery of cam 76 during forward travel of the bicycle as would be considered counter-clockwise of said cam as viewed in FIG. 11 and being adapted to engage either cam lobe 77, 77' upon back pedalling operation of the bicycle, as into the condition illustrated in FIG. 11. In order to maintain pawl 80 in contact with cam 76 there is provided a compression spring 82, one end of which is fixed on pin 79 (see FIGS. 10 and 11) and with the opposite end overlying the upper edge of pawl 80. Pawl 80 in its rearward upper edge portion is provided with an arcuated generally forwardly opening recess 83 which is aligned with an aperture 84 formed in plate 78 for extension therethrough of the bight-forming lower end portion of a control rod 48' which is of fundamentally like construction as control rod 48 above described. It will be observed that pawl 80 is devoid of a flange corresponding to flange 44 of pawl 42 above described; however, the lower end portion of the related control rod 48' will engage the margin of recess 83 upon operation, for causing disengagement of pawl 80 with cam 76 for purposes to be more fully described. It is to be observed that aperture 84 is of relatively increased diameter with respect to the cross-section of control rod 48' so that the latter freely projects therethrough and in normal or inoperative position will not be in contact with pawl 80 and thereby obviate any interference with the operation thereof. Plate 78 will be accorded a limited degree of relative movement with respect to the engaged portion of shaft 17'. Control rod 48' is operatively associated in its upper end portion with fundamentally the same elements as control rod 48 described hereinabove but with the exception that cable 58 extends forwardly adjacent the right hand side of seat post 7 rather than the left hand side as described more fully hereinabove with respect to the bicycle incorporating the American made, one piece crank, so that in operation control rod 48' must necessarily be rotated in the opposite direction as control rod 48 in order to engage pawl 80 and effect disengagement of the same with cam 76 in order to allow for backward movement of the bicycle without development of braking action, all as suggested by the arrow in FIG. 13.

Figure 13:
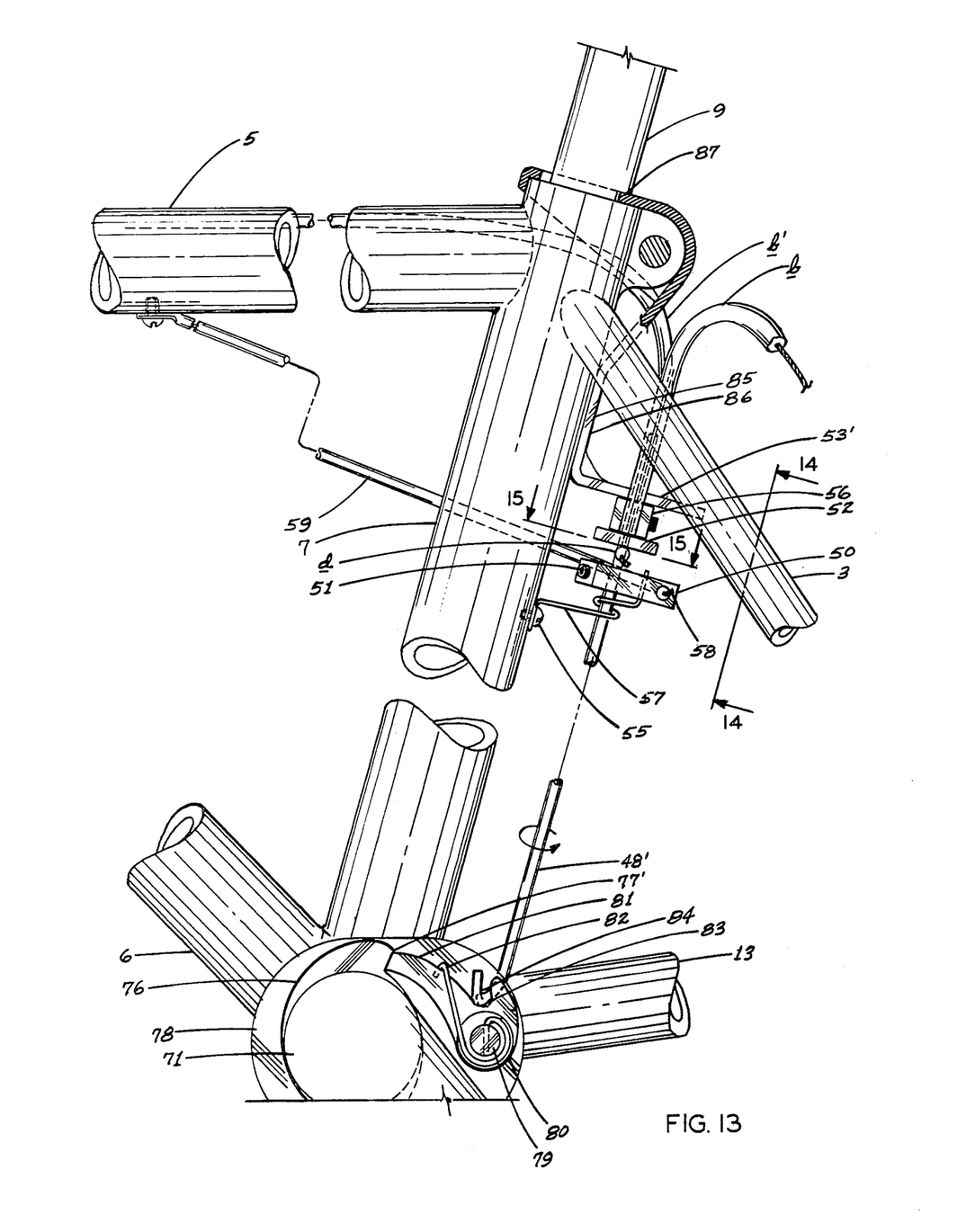
FIG. 13 is an enlarged fragmentary view, in partial section, of the bicycle illustrating the brake and release system therefor, being of the type adapted for foreign made bicycles as illustrated in FIG. 11 et seq.
Figure 14:
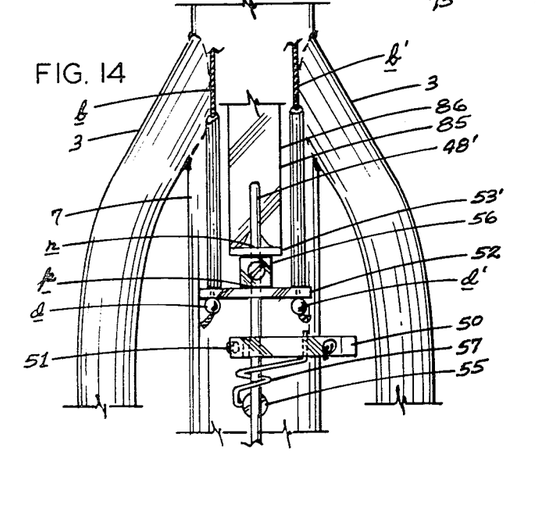
FIG. 14 is a vertical view taken on the line 14—14 of FIG. 13.
Figure 15:
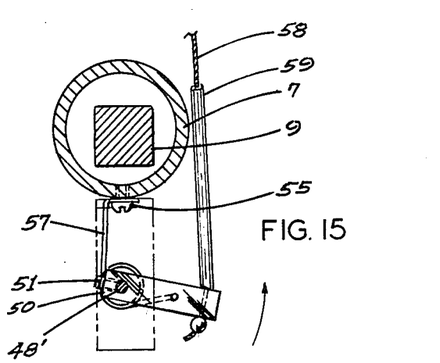
FIG. 15 is a horizontal transverse sectional view taken on the line 15—15 of FIG. 13.

With respect to FIGS. 13, 14 and 15, it will be seen that upwardly of locking lug 56 control rod 48' will extend through the flange 53' of a stamped bracket 85 having a vertical portion 86 welded or otherwise rigid upon the adjacent rearward portion of seat post 7 and which vertical portion is continuous with a rearwardly and thence forwardly extending tongue 87 for latching relationship with the locking openings provided in the seat adjustment assembly members for permitting height adjustment of the seat by the rider without dismounting from the bicycle, all as described more fully in the aforesaid co-pending application Ser. No. 799,566. From the foregoing it will be seen that upon back pedalling, the braking action is substantially identical with that described hereinabove wherein cam 76 engages pawl 80, causing a downward and rearward rocking of plate 78 so as to pull control rod 48' a sufficient distance to exert a downward force upon brake cables b, b' to bring about braking action. Operation of control rod 48' has been basically fully described to demonstrate the manner of release of pawl 80 for unlocking of the bicycle brakes to permit rearward movement or backing up as for parking and the like; such releasing action being effected merely by the user pulling forwardly upon sheathed cable 59.

Figure 10:
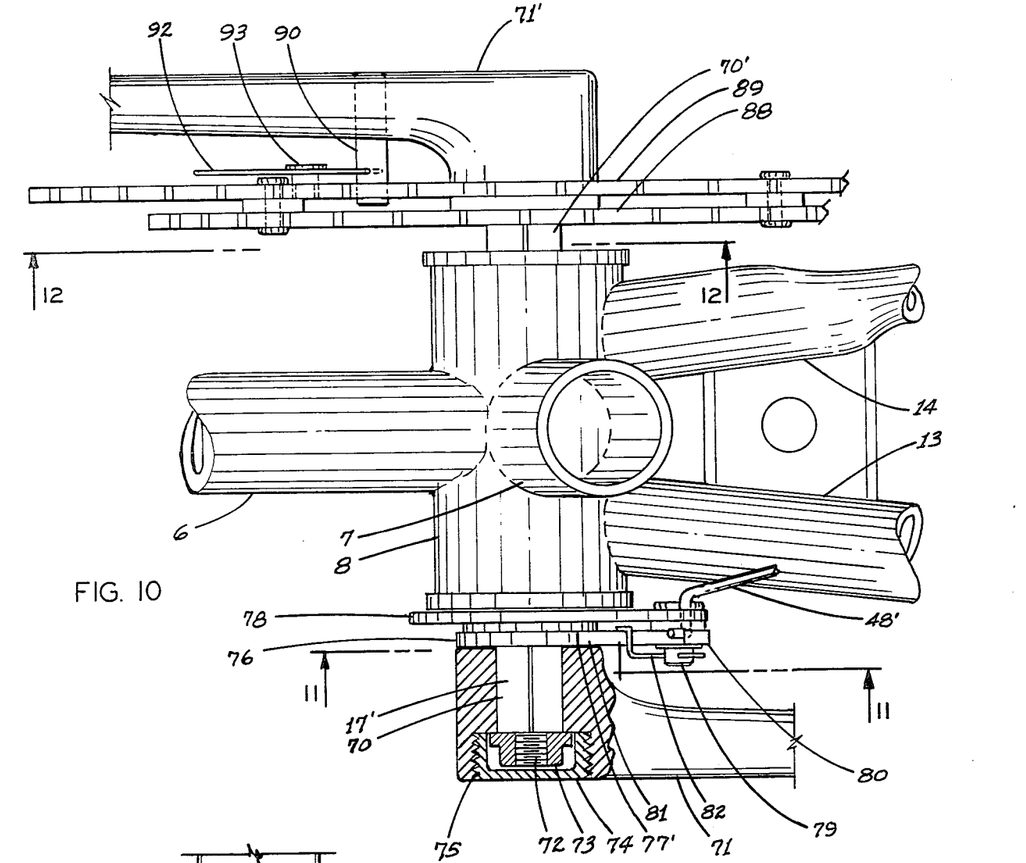
FIG. 10 is a top plan view taken substantially on the line 2—2 of FIG. 1 but illustrating another form of brake control and release system constructed in accordance with and embodying the present invention.
Figure 11:
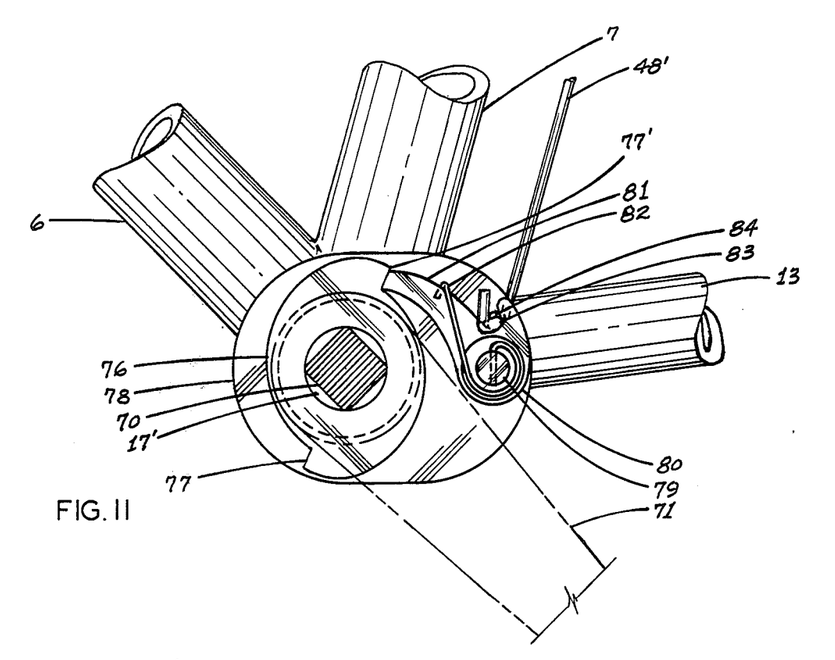
FIG. 11 is a vertical transverse sectional view taken on the line 11—11 of FIG. 10.
Figure 12:
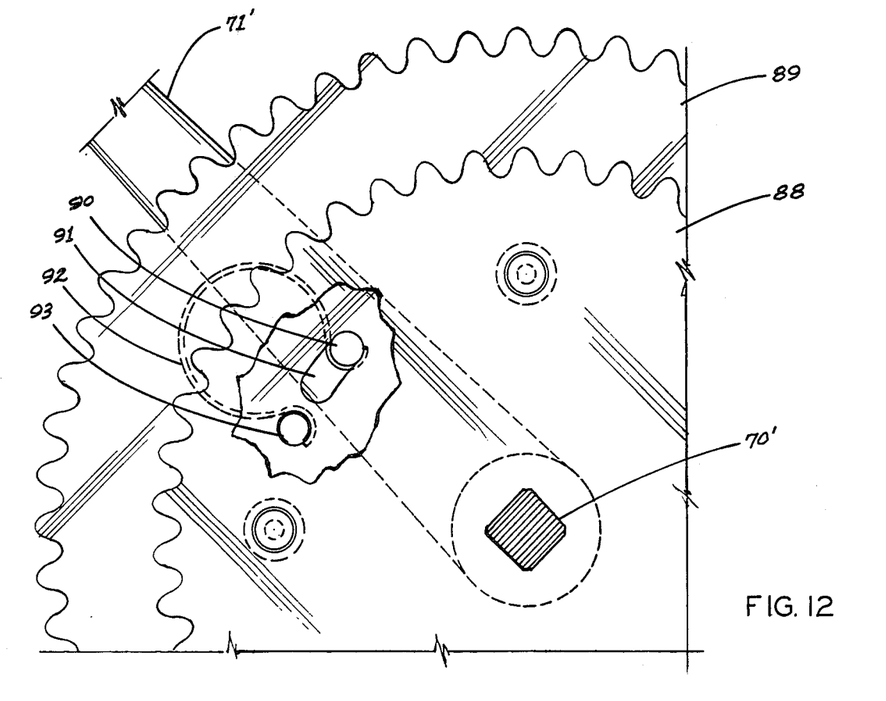
FIG. 12 is a fragmentary side view taken on the line 12—12 of FIG. 10.

Turning now to FIGS. 10 and 12, it will be observed that mounted upon shaft end portion 70' are inner and outer sprocket wheels 88, 89, the former being of lesser diameter, as is expected with the usual ten-speed bicycle. Crank shaft 71' rigidly mounts a finger or pin 90 which projects laterally inwardly for reception within a slot-like opening 91 formed in outer sprocket wheel 89 and being normally urged toward the rearward end thereof by a compression spring 92 which is generally of annular shape but having one end portion engaged about said finger 90 and the other end fixed upon a pin 93 engaged rigidly in said sprocket 89. Said spring 92, just as spring 64 hereinabove described, urges finger 90 toward the rearward end of opening 91 during normal operation. After the bicycle has been put in braked condition, upon forward pedalling by the user, sprocket 89 will be allowed to rotate a distance substantially equivalent to the length of opening 91, causing stressing of spring 92, but moving said finger 90 relatively toward the forward end of slot 91 thereby permitting forward travel of the related drive chain 23 so that the main shaft will move to remove cam 76 from engagement with pawl 80, thereby unbraking of the bicycle is effected to allow forward travel to be resumed, all as described more fully hereinabove in conjunction with sprocket wheel 22. It will be appreciated that said latter, being a single wheel, is of the type normally utilized upon a bicycle of the single or three-speed variety.

Having described my invention, what I claim and desire to obtain by Letters Patent is:

1. For use with a bicycle having a frame with a hub-forming casing, front and rear wheels supported on said frame, a pedal crank assembly having a shaft extending through said hub-forming casing and projecting at its ends therebeyond and pedal cranks provided at each end of the shaft, and front and rear wheel caliper brakes, the improvement comprising a brake control assembly having a cam mounted on said shaft for rotation therewith and having at least one cam working surface, a plate carried on said shaft for limited swingable movement with respect thereto and being in substantially planarwise parallel relationship to said cam, a brake control cable extending from each of said front and rear caliper brakes, a link having an upper end portion operably secured to said brake control cables, said link having a lower end portion engaged to said plate, a cam follower pivoted in its rearward portion upon said plate and having a forwardly extending free end forward portion engageable with said at least one cam working surface upon back pedalling whereby such engagement effects a limited rocking of said plate with consequent downward movement of said link to effect pulling on said brake cables for bicycle braking action.

2. The improvement as defined in claim 1 and further characterized by bearing means on said frame journalling said link for axial rotative movement, the engagement of said lower end portion of said link to said plate being such as to permit of such rotative movement.

3. The improvement as defined in claim 2 and further characterized by means urging said link into spaced apart relationship in the lower end portion thereof with said cam follower, and means for effecting rotative movement of said link causing engagement thereof with said cam follower for brake disengaging action.

4. The improvement as defined in claim 1 and further characterized by said link being a rod, bearing means provided on said frame journalling said rod for axial rotative movement, said plate having an opening proximate the pivotal mounting of said cam follower, the lower end portion of said rod projecting through said opening, said opening being of greater cross-section than said rod to permit of rotative movement of the latter with respect thereto.

5. The improvement as defined in claim 4 and further characterized by means normally urging said rod to present the lower end portion in spaced relationship to the adjacent portion of said cam follower, and means for effecting rotation of said rod to bring the lower end portion into engagement with said cam follower for rocking same from engagement with said at least one cam working surface.

6. The improvement as defined in claim 1 and further characterized by resilient means normally urging said cam follower into contactive relationship with said cam and wherein said cam is a disc cam having a pair of operating edges spaced apart through an angle of 180°.

7. The improvement as defined in claim 6 and further characterized by said disc cam being located laterally inwardly of said plate and said means rockably mounted on said plate being disposed upon the inner face thereof.

8. The improvement as defined in claim 6 and further characterized by said cam being located laterally outwardly of said plate, and said cam follower being disosed on the outwardly directed face thereof.

9. The improvement as defined in claim 5 and further characterized by said means for effecting rotation of said rod comprising a lever arm fixed at one end upon said rod and projecting outwardly therefrom in axial perpendicular relationship thereto, and a control cable having one end attached to the outer end of said lever arm and the other end secured upon said frame at a point forwardly of said rod and lever arm whereby a forward pulling force upon said cable will effect rotative movement of said rod.

* * * * *